(12) United States Patent
van der Gaast

(10) Patent No.: US 7,920,488 B2
(45) Date of Patent: Apr. 5, 2011

(54) METHOD AND APPARATUS FOR ESTABLISHING A DISTRIBUTED CONFERENCE BRIDGE

(75) Inventor: Tjietse van der Gaast, Huizen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 897 days.

(21) Appl. No.: 11/080,716

(22) Filed: Mar. 15, 2005

(65) Prior Publication Data

US 2006/0209728 A1    Sep. 21, 2006

(51) Int. Cl.
*H04L 12/16*    (2006.01)
(52) U.S. Cl. ............... 370/261; 370/400; 379/202.01
(58) Field of Classification Search ............ 348/14.08; 370/260, 261, 262; 379/202.01; 704/500; 709/204

See application file for complete search history.

(56) References Cited

U.S. PATENT DOCUMENTS

| | | | |
|---|---|---|---|
| 5,751,338 A * | 5/1998 | Ludwig, Jr. | 348/14.12 |
| 6,697,341 B1 * | 2/2004 | Roy | 370/260 |
| 7,496,188 B2 | 2/2009 | Saha et al. | |
| 2004/0190701 A1 * | 9/2004 | Biage | 379/202.01 |
| 2006/0062368 A1 * | 3/2006 | Saha et al. | 379/202.01 |

* cited by examiner

*Primary Examiner* — Chirag G Shah
*Assistant Examiner* — Yong Zhou
(74) *Attorney, Agent, or Firm* — Wall & Tong, LLP

(57) ABSTRACT

The invention comprises a method and apparatus for establishing a conference bridge. Specifically, the method comprises obtaining at least one request for establishing the conference bridge where the conference bridge is operable for enabling communications between a plurality of user devices, and determining a configuration for establishing the conference bridge, the configuration comprising at least one sub-bridge wherein each of the at least one sub-bridge comprises a communication path between a first combining user device and one of a second combining user device and a non-combining user device, wherein the configuration tends to minimize a bandwidth required for supporting communications between the plurality of user devices.

14 Claims, 4 Drawing Sheets

METHOD AND APPARATUS FOR ESTABLISHING A DISTRIBUTED CONFERENCE BRIDGE

FIELD OF THE INVENTION

The invention relates to the field of communication networks and, more specifically, to establishing multi-party conferences.

BACKGROUND OF THE INVENTION

In general, multi-party conference calls enable parties at different locations to communicate with each other. In the current paradigm, in order to support a conference call for n parties, $n(n-1)$ media streams must be established. Unfortunately, for $n>2$, the bandwidth consumed by the $n(n-1)$ media streams is significantly larger then necessary for supporting communications between the n parties. Similarly, in order to support a conference call for n parties using a standard conference bridge, $2n$ media streams must be established. Unfortunately, when a portion of the parties are located in a sub-network, and the conference bridge is located outside that sub-network, the network resources consumed by the $2n$ media streams is significantly larger then necessary for supporting communications between the n parties.

SUMMARY OF THE INVENTION

Various deficiencies in the prior art are addressed through the invention of a method and apparatus for establishing a conference bridge. Specifically, a method according to one embodiment of the invention comprises obtaining at least one request for establishing the conference bridge where the conference bridge is operable for enabling communications between a plurality of user devices, and determining a configuration for establishing the conference bridge, the configuration comprising at least one sub-bridge wherein each of the at least one sub-bridge comprises a communication path between a first combining user device and one of a second combining user device and a non-combining user device, wherein the configuration tends to minimize a bandwidth required for supporting communications between the plurality of user devices.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a communications network architecture comprising a plurality of Internet Protocol (IP) based networks; however, the invention can readily be applied to other networks and network topologies. In general, the invention enables establishment of a conference bridge in a manner tending to minimize the bandwidth required for supporting the conference bridge. By computing a configuration for establishing the conference bridge, and implementing the configuration using a plurality of sub-bridges, conference bridging functionality may be distributed across at least a portion of the user devices participating in the conference in a manner tending to reduce the bandwidth required for supporting the conference bridge. As such, by minimizing the bandwidth required to support the conference bridge, the present invention thereby enables a corresponding increase in quality of service of the associated conference.

Figure 1:
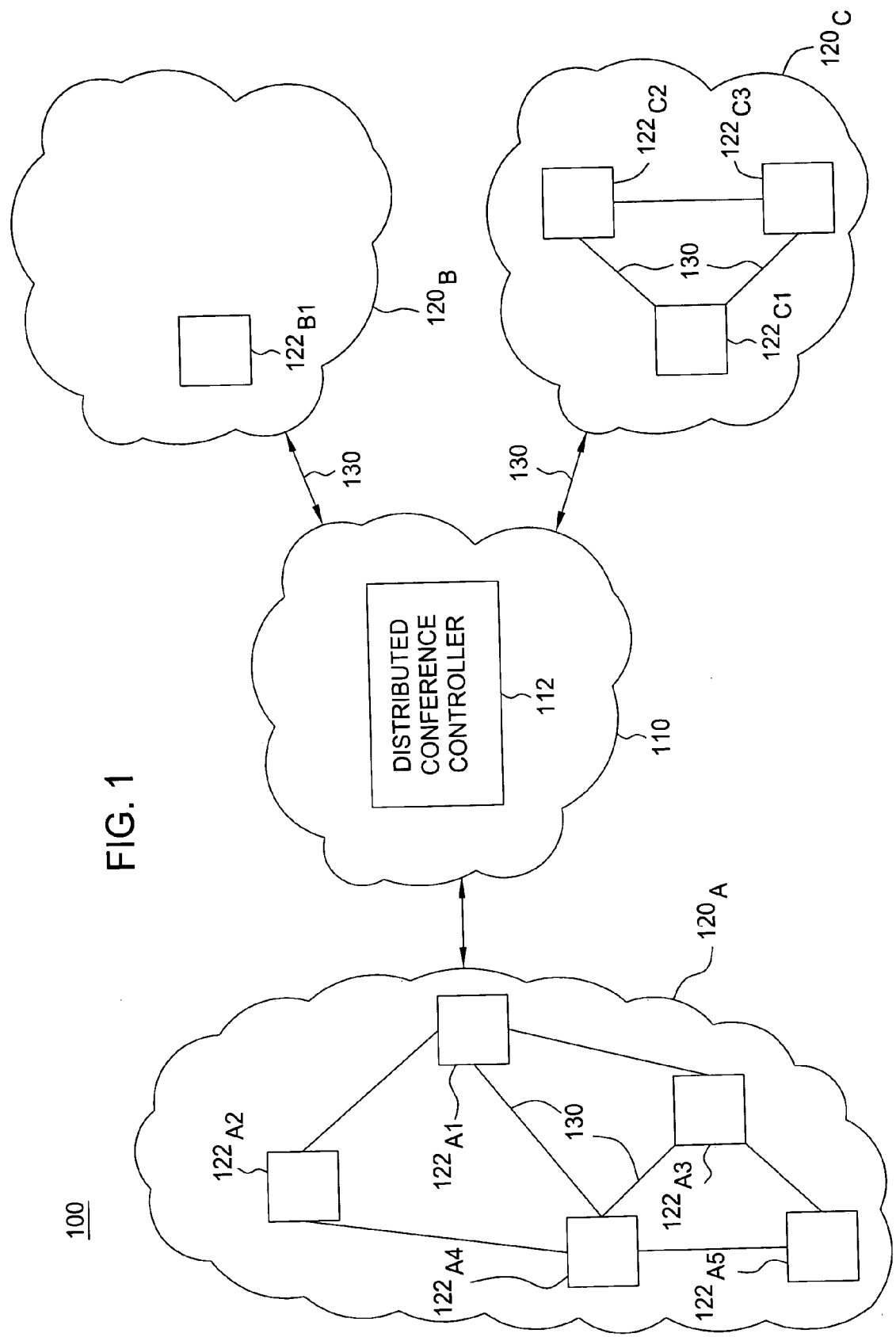
FIG. 1 depicts a high-level block diagram of a communications network architecture.

FIG. 1 depicts a high-level block diagram of a communications network architecture. Specifically, communications network architecture 100 of FIG. 1 comprises a core network (CN) 110, a plurality of sub-networks (SNs) $120_A$-$120_C$ (collectively, SNs 120) and a distributed conference controller (DCC) 112. As depicted in FIG. 1, the SNs 120 communicate with CN 110 via an associated plurality of communication links (CLs) 130 (collectively, CLs 130).

The CN 110 comprises a network operable for enabling communication between user devices in different sub-networks. In one embodiment, for example, CN 110 comprises an Internet protocol (IP) network, such as an IP Multimedia Subsystem (IMS) network. Similarly, the SNs 120 comprise networks operable for enabling communications between user devices associated with each of the respective SNs 120. For example, the SNs 120 comprise IP networks, cable networks, digital subscriber line (DSL) networks, corporate local area networks (LANs), and the like. As such, although not depicted, CN 110 and SNs 120 comprise various network elements, service logic, communication links and like network components for supporting communications between user devices.

As depicted in FIG. 1, SN $120_A$ comprises a plurality of user devices (UDs) $122_{A1}$-$122_{A5}$ (collectively, UDs $122_A$), SN $120_B$ comprises UD $122_B$, and SN $120_C$ comprises a plurality of UDs $122_{C1}$-$122_{C3}$ (collectively, UDs $122_C$). The UDs $122_A$-$122_C$ are collectively denoted as UDs 122. In general, the UDs 122 comprise network devices operable for capturing information from users, transmitting and receiving information, combining signals, presenting information to users, and performing like functions. For example, the UDs 122 comprise IP phones, computers, and the like. The UDs 122 communicate within respective SNs 120 using CLs 130, and the UDs 122 communicate between SNs 120 via CN 110 and associated CLs 130.

As depicted in FIG. 1, the CN 110 comprises DCC 112. In one embodiment, DCC 112 performs at least a portion of the methodologies of the present invention. Furthermore, although depicted as a stand-alone controller, in one embodiment, DCC 112 supports functions provided by various network components in CN 110 (not depicted). In other words, the functionality of DCC 112 may be implemented in a distributed fashion (i.e., distributed across a portion of the network components of CN 110). For example, in an IMS-based network, a portion of the functionality of DCC 112 is implemented on at least one of a home location register (HLR), at least one call state control function (CSCF), and like IMS network components.

Although depicted as comprising specific numbers of CNs 110, DCCs 112, SNs 120, UDs 122, and CLs 130, those skilled in the art will appreciate the fewer or more CNs 110, DCCs 112, SNs 120, UDs 122, and CLs 130 may be used. Similarly the CNs 110, DCCs 112, SNs 120, UDs 122, and CLs 130 may be deployed in various different configurations. Furthermore, various other networks, network elements, user devices and communication links may be utilized in support of the methodologies of the present invention.

Figure 2:
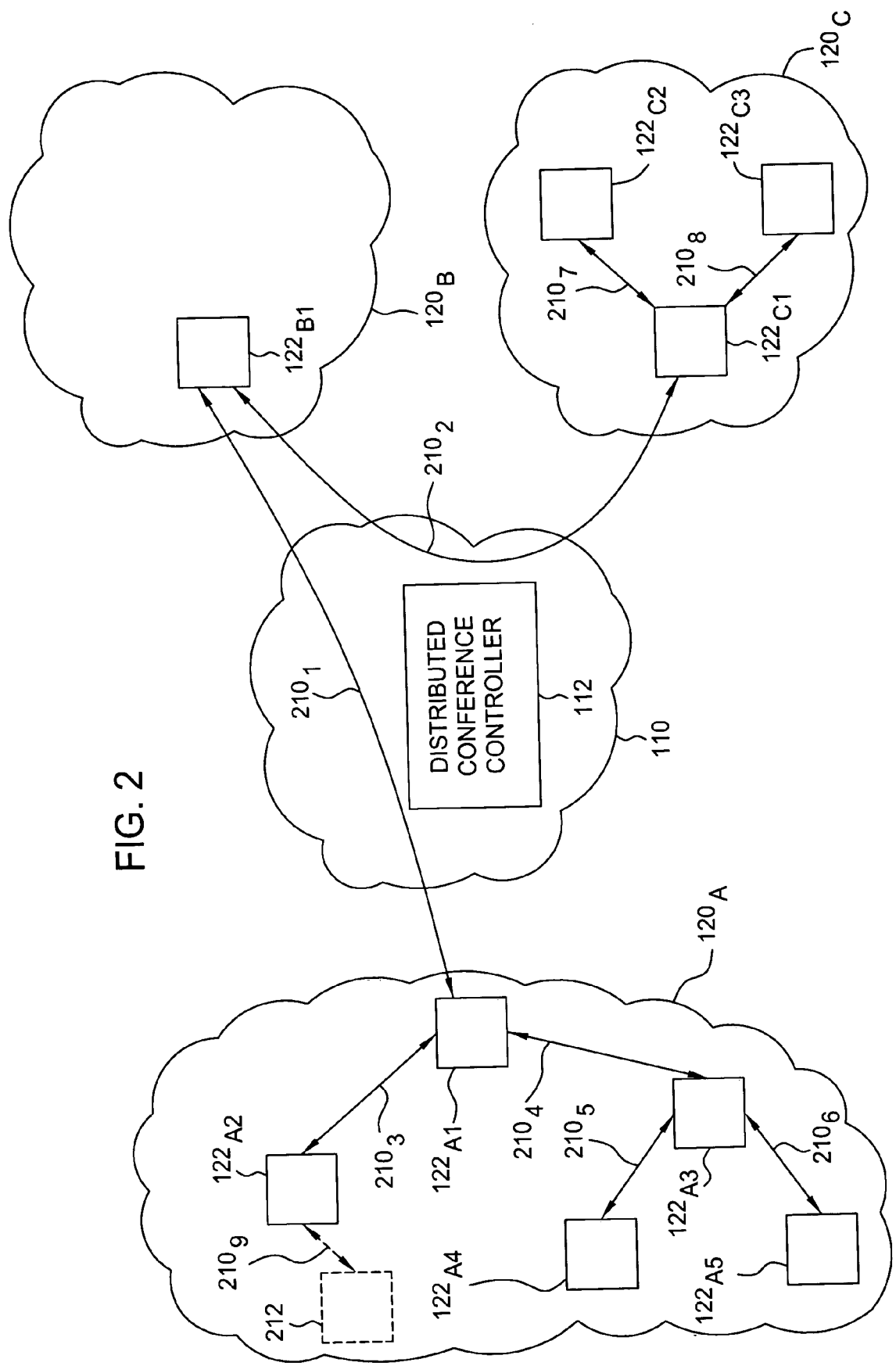
FIG. 2 depicts the communications network architecture of FIG. 1 in which a plurality of sub-bridges has been established.

FIG. 2 depicts a high-level block diagram of the communications network architecture of FIG. 1 in which a plurality of sub-bridges has been established. Specifically, communications network architecture 200 of FIG. 2 comprises a plurality of sub-bridges (SBs) $210_1$-$210_8$ (collectively, SBs 210). The SB $210_1$ comprises a bridge between the UDs $122_{A1}$ and $122_{B1}$, SB $210_2$ comprises a bridge between UDs $122_{B1}$ and $122_{C1}$, SB $210_3$ comprises a bridge between UDs $122_{A1}$ and $122_{A2}$, SB $210_4$ comprises a bridge between UDs $122_{A1}$ and $122_{A3}$, SB $210_5$ comprises a bridge between UDs $122_{A3}$ and $122_{A4}$, SB $210_6$ comprises a bridge between UDs $122_{A3}$ and $122_{A5}$, SB $210_7$ comprises a bridge between UDs $122_{C1}$ and $122_{C2}$, and SB $210_8$ comprises a bridge between UDs $122_{C1}$ and $122_{C3}$.

In general, a sub-bridge comprises a communication path between UDs for distributing information between the UDs. In one embodiment, the establishment of and use of the SBs 210 depends upon the underlying network technologies. In other words, a sub-bridge communication path depends upon the technology of the SN(s) and, for SBs spanning a plurality of SNs via an associated CN, depends upon the technology of the CN. For example, in an IP-based SN, establishment of a SB may be performed using at least one Session Initiation Protocol (SIP) SETUP message.

The SBs 210 collectively comprise a configuration. As described herein, a configuration comprises a conference bridge configuration that minimizes the bandwidth required to support communications between a plurality of UDs. In one embodiment, a configuration comprises at least one SB (illustratively, at least one SB 210). In one embodiment, a configuration is determined by DCC 112 according to the methodologies of the present invention. In another embodiment, a configuration is determined by at least one of the UDs 122 according to the methodologies of the present invention. In one embodiment, the configuration comprises an optimum configuration.

As depicted in FIG. 2, the UDs $122_{A2}$, $122_{A4}$, $122_{A5}$, $122_{C2}$ and $122_{C3}$ operate as non-combining UDs. In general, a non-combining UD captures information from at least one user via at least one associated user interface, transmits captured information towards each of the UDs 122, receives information from each of the UDs 122, and the presents the received information to at least one user via at least one associated user interface. Similarly, UDs $122_{A1}$, $122_{A3}$, $122_{B1}$ and $122_{C1}$ operate as combining UDs. In general, a combining UD performs signal switching, signal mixing, and like signal processing for bridging various signals between the UDs 122, thereby enabling distribution of information amongst the UDs 122. Furthermore, combining UDs perform non-combining UD functions, as described herein.

For example, assume that a user associated with UD $122_{A4}$ is speaking to users associated with each of the other UDs 122. In this example, a user interface associated with UD $122_{A4}$ captures the audio signal as the user is speaking, and transmits the audio signal to UD $122_{A3}$ via SB $210_5$. Upon receiving the audio signal, UD $122_{A3}$ transmits the audio signal to UD $122_{A1}$ via SB $210_4$ and, similarly, transmits the audio signal to UD $122_{A5}$ via SB $210_6$. Similarly, upon receiving the audio signal, UD $122_{A1}$ transmits the audio signal to UD $122_{A2}$ via SB $210_3$, and transmits the audio signal to UD $122_{B1}$ via SB $210_1$. In other words, each of the SBs 210 are used for transporting the mixed and switched audio signals between UD $122_{A4}$ and at least a portion of the other UDs 122, thereby reducing the bandwidth required for supporting the conference bridge.

Figure 3:
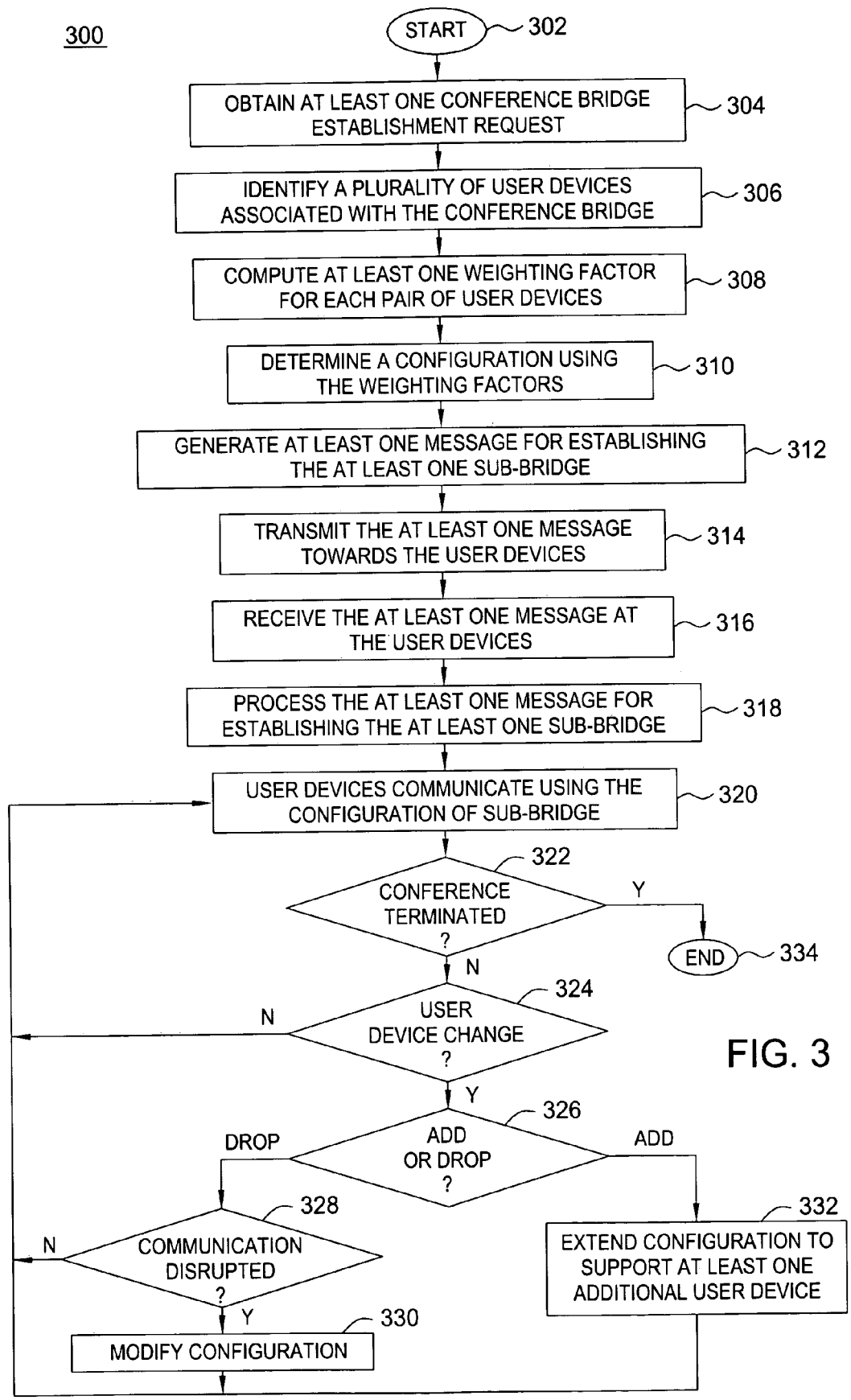
FIG. 3 depicts a flow diagram of a method according to one embodiment of the invention.

FIG. 3 depicts a flow diagram of a method according to one embodiment of the invention. Specifically, method 300 of FIG. 3 comprises a method for establishing a conference bridge for enabling communication between a plurality of user devices. Although a portion of the steps are depicted as being performed serially, those skilled in the art will appreciate that at least a portion of the steps of method 300 may be performed contemporaneously, as well as in a different order than presented in FIG. 3. The method 300 is entered as step 302 and proceeds to step 304.

At step 304, at least one conference bridge establishment request is obtained. In one embodiment, a conference bridge establishment request is obtained by a DCC (illustratively, DCC 112) from an originating UD. In one such embodiment, in which the originating UD performs at least a portion of the DCC functions described herein, the conference bridge establishment request may be obtained by the originating UD. In another embodiment, a conference bridge establishment request is obtained by a DCC from each of the respective UDs attempting to access the conference.

At step 306, a plurality of UDs associated with the conference bridge is identified. In one embodiment, the UDs associated with the conference bridge are identified by a DCC. In another embodiment, in which the originating UD performs at least a portion of the functions of the DCC, the plurality of UDs associated with the conference bridge are identified by the originating UD. In one embodiment, the UDs associated with the conference bridge are identified using the at least one conference bridge establishment request. For example, a conference bridge establishment request message (e.g., a SIP SETUP message) may comprise the UDs (e.g., identified by IP address) scheduled to participate in the conference.

At step 308, at least one weighting factor is computed for each pair of UDs. In one embodiment, a DCC computes the respective weighting factors associated with each pair of UDs using locally stored information. In another embodiment, a DCC signals at least one UD in each pair of UDs to determine the respective weighting factors associated with each pair of UDs. In one such embodiment, the DCC computes the respective weighting factors using weighting information received by the DCC from each of the UDs. In another such embodiment, at least one UD in each pair of UDs computes at least one weighting factor associated with the pair of UDs and transmits the at least one weighting factor to the DCC.

Similarly, in another embodiment, at least one UD signals every other UD in order to obtain weighting information for computing the respective weighting factors associated with each pair of UDs. In one embodiment, for example, an originating UD signals every other UD in order to determine the respective weighting factors. In another embodiment, for example, at least one UD operating as a controlling UD signals every other UD in order to determine the respective weighting factors. In still another embodiment, for example, each UD signals every other UD determine the respective weighting factors.

In one embodiment, a weighting factor is determined according to a path length associated with the communication path between a pair of UDs, where a pair of UDs comprises a first UD and a second UD. In one such embodiment, path length is measured according to a number of hops between the first UD and second UD. In one such embodiment, in which a plurality of paths exist between the UDs, the path requiring the fewest number of hops produces the most desirable weighting factor. For example, as depicted in FIG. 1, although UD $122_{A1}$ may communicate with UD $122_{A3}$ both directly and indirectly (via UD $122_{A4}$), the weighting factor associated with the direct communication path between UDs $122_{A1}$ and $122_{A3}$ is more desirable than the weighting factor associated with the indirect communication path between UDs $122_{A1}$ and $122_{A3}$ via UD $122_{A4}$.

In another embodiment, a weighting factor is determined according to a path delay associated with the communication path between a pair of UDs. In one such embodiment, in which a plurality of paths exist between the pair of UDs, the path comprising the shortest delay time produces the most desirable weighting factor. For example, as depicted in FIG. 1, although UD $122_{A1}$ is directly connected to UDD $122_{A4}$, the path delay associated with the indirect communication path between UD $122_{A1}$ and UD $122_{A4}$ via UD $122_{A3}$ may be smaller than the path delay associated with the direct communication path, thereby resulting in a more desirable weighting factor associated with the indirect communication path.

In another embodiment, a weighting factor is determined using at least one of a path length (e.g., a distance between a first UD and a second UD, a number of hops between a first UD and a second UD, and the like), a path delay, UD location information (e.g., a first location associated with a first UD and a second location associated with a second UD), UD device capabilities (e.g., a comparison between at least one capability supported by a first UD and at least one capability supported by a second UD), and like parameters for optimizing routing between network devices. Although described herein with respect to use of weighting factors to determine a configuration, in one embodiment, the configuration is determined randomly.

In one embodiment, for example, a weighting factor is determined according to respective locations associated with each UD in a pair of UDs. As such, as depicted in FIG. 1, although the path delay between UD $122_{A3}$ and UD $122_{C1}$ is relatively small compared to the path delay between UD $122_{A3}$ and UD $122_{A1}$, the weighting factor associated with the path between UD $122_{A3}$ and UD $122_{A1}$ may be more desirable due to the location of UDs $122_{A3}$ and $122_{A1}$ may within the same SN (i.e., the path does not consume CN resources).

In another embodiment, for example, a weighting factor is determined according to respective device capabilities associated with each UD in a pair of UDs. In one such embodiment, the device capabilities may be used for ensuring that UDs comprising specific capabilities operate as combining UDs in the configuration. For example, as depicted in FIG. 1, although path delay between UD $122_{A5}$ and UD $122_{A1}$ via UD $122_{A4}$ is substantially the same as the path delay between UD $122_{A5}$ and UD $122_{A1}$ via UD $122_{A3}$, a weighting factor associated with the path between UD $122_{A5}$ and UD $122_{A1}$ via UD $122_{A3}$ is more desirable due to enhanced signal combining and mixing capabilities associated with UD $122_{A3}$ (as compared to signaling and combining capabilities associated with UD $122_{A4}$).

In one example, the DCC signals each UD to issue a trace command to every other UD for determining the weighting factors for each pair of UDs. In this example, each UD initiates a trace command to every other UD associated with the conference bridge in order to determine associated path lengths. In another example, the DCC signals each UD to issue a ping command to every other UD for determining the weighting factors for each pair of UDs. In this example, each UD initiates a ping command to every other UD associated with the conference bridge in order to determine associated path delays. The use of trace commands for determining communication path lengths and use of ping commands for determining communication path delays is well known in the art.

At step 310, a configuration is determined using the weighting factors. As described herein, a configuration comprises at least one sub-bridge. In one embodiment, a DCC determines the configuration using at least one of weighting factors determined using locally stored information, weighting factors obtained from at least a portion of the UDs 122, and the like. In another embodiment, at least one UD determines the configuration. In one such embodiment, an originating UD determines the configuration from weighting factors obtained from at least a portion of the other UDs. In another such embodiment, at least one controlling UD determines the configuration using weighting factors obtained from at least a portion of the other UDs. In another such embodiment, determination of the configuration is distributed across at least a portion of the UDs. For example, each UD processes respective weighting factors locally in order to determine whether to establish at least one sub-bridge with at least one other UD.

For example, although UD $122_{A1}$ and UD $122_{A4}$ are directly connected via a CL 130 (as depicted in FIG. 1), in the configuration depicted in FIG. 2, a sub-bridge is not established between UD $122_{A1}$ and UD $122_{A4}$. As such, although UD $122_{A1}$ and UD $122_{A4}$ are directly connected (i.e., a single hop), a delay associated with the communication path between UD $122_{A1}$ and UD $122_{A4}$ may have been such that communication between UD $122_{A1}$ and UD $122_{A4}$ using a configuration requires a plurality of sub-bridges associated with a different communication path. As such, as depicted in FIG. 2, UD $122_{A1}$ and UD $122_{A4}$ communicate via UD $122_{A3}$ and associated SBs $210_4$ and $210_5$. Similarly, computation of the weighting factors associated with the UDs $122_C$ may result in a determination that establishment of SB $210_8$ between UD $122_{C1}$ and UD $122_{C3}$ is more efficient then establishment of SB $210_8$ between UD $122_{C2}$ and UD $122_{C3}$.

Similarly, although an additional hop is required for transmitting information between UDs $122_{A1}$ and $122_{A4}$, SB $210_5$ is established between UD $122_{A3}$ and UD $122_{A4}$ (as opposed to being established between UD $122_{A1}$ and UD $122_{A4}$) due to excessive delay associated with the communication path between UD $122_{A1}$ and $122_{A4}$. In one embodiment, a weighting factor is determined according to the location of each of the UDs in the pair of UDs for which the weighting factor is determined. For example, weighting factors associated with pairs of UDs located within the same sub-network may be weighted in a manner tending to prefer creation of sub-bridges between UDs located within the same sub-network (as opposed to UDs located in different sub-networks).

At step 312, at least one message for establishing the at least one sub-bridge (i.e., SB establishment message) is generated. For example, in an IMS-based network, at least one SIP SETUP message may be generated in order to establish a SB. At step 314, the SB establishment messages are transmitted towards at least a portion of the UDs. In one embodiment, generation and transmission of the SB establishment messages is performed by a DCC (illustratively, DCC 112). In another embodiment, generation and transmission of the SB establishment messages is performed by at least one UD (illustratively, at least one of the UDs 122). In one such embodiment, generation and transmission of the SB establishment messages is performed by at least one of an originating UD, at least one controller UD, at least a portion of the UDs, all UDs, and the like.

In one embodiment, in which a DCC generates and transmits SB establishment messages, the DCC generates and transmits the messages to all UDs participating in the conference (i.e., to both combining UDs and non-combining UDs). In another embodiment, in which a DCC generates and transmits SB establishment messages, the DCC transmits the messages to combining UDs. In one further embodiment, the combining UDs signal associated non-combining UDs and other combining UDs in order to establish the respective sub-bridges.

Similarly, in another embodiment, in which a UD generates and transmits SB establishment messages, the UD transmits the messages to at least one of a portion of the combining UDs, all combining UDs, all combining UDs and non-combining UDs, and the like. In one embodiment, in which not all UDs receive SB establishment messages, signaling is performed between various combinations of combining UDs and non-combining UDs in order to establish the SBs.

At step 316, the at least one message is received at the UDs. In one embodiment, in which the DCC transmits SB establishment messages to all UDs, all UDs receive and process the messages. In another embodiment, in which the DCC transmits messages to combining UDs, the combining UDs receive and process the messages. In one further embodiment, the combining UDs communicate with other combining UDs, as well as non-combining UDs, in order to establish the SBs of which the configuration is composed. In another embodiment, in which combining UDs transmit SB establishment messages to non-combining UDs, various combinations of combining UDs and non-combining UDs receive and process the messages in order to complete establishment of the associated SBs.

As described herein, a combining UD performs switching, mixing, and the like of various audio signals, video signals, and like signals communicated between UDs according to the configuration. As such, in one embodiment, processing of a SB establishment message on a combining UD configures the combining UD to perform combining functions (i.e., switching, mixing, and the like). In another embodiment, processing of SB establishment messages on combining UDs triggers signaling between combining UDs and non-combining UDs for finalizing establishment of the SBs.

For example, assume that DCC 112 determines a configuration (illustratively, the configuration of SBs 210 depicted and described with respect to FIG. 2). Furthermore, assume that DCC 112 generates the SB establishment messages required for establishing the SBs 210. In this example, DCC 112 transmits at least one SB establishment message to each combining UD (e.g., such as UD $122_{A3}$). In this example, UD $122_{A3}$ performs configuration processing locally in order to configure UD $122_{A3}$ to receive various signals from UDs $122_{A4}$ and $122_{A5}$, to combine the signals received from UDs $122_{A4}$ and $122_{A5}$ with signals obtained from UD $122_{A3}$, and to transmit the combined signals towards UD $122_{A1}$. Furthermore, in this example, UD $122_{A3}$ signals the UDs $122_{A4}$ and $122_{A5}$ in order to instruct UDs $122_{A4}$ and $122_{A5}$ to transmit content towards UD $122_{A3}$ for distribution to the other UDs 122.

In one embodiment, signaling between the DCC and the UDs, as well as between UDs, is performed using at least one standard protocol as known in the art. For example, assuming communications network architecture 200 of FIG. 2 comprises an IP-based network architecture, the signaling required for identifying the plurality of UDs, computing weighting factors associated with pairs of UDs, transmitting messages to UDs for establishing SBs, and like signaling required for establishing the sub-bridges, is performed using at least one of session initiation protocol (SIP) signaling, H.323 signaling, and the like IP signaling protocols as known in the art. Furthermore, since the SNs 120 may be implemented using numerous different technologies, a variety of associated signaling protocols may be used.

At step 320, the UDs communicate using the configuration of sub-bridges. For example, UD $122_{A1}$ collects information from UDs $122_{A2}$, $122_{A3}$, $122_{A4}$ (via UD $122_{A3}$), and $122_{A5}$ (via UD $122_{A3}$), and distributes information to UDs $122_{A2}$, $122_{A3}$, $122_{A4}$, and $122_{A5}$. Similarly, UD $122_{C1}$ collects information from UDs $122_{C2}$ and $122_{C3}$, and distributes information to UDs $122_{C2}$ and $122_{C3}$. Finally, UD $122_{B1}$ collects information from UDs $122_{A1}$ and $122_{C1}$, and distributes information to UDs $122_{A1}$ and $122_{C1}$. As such, each of the UDs 122 communicates with every other UD 122 via the associated SBs 210.

At step 322, a determination is made as to whether the conference is terminated. In one embodiment, the determination as to whether a conference is terminated is performed by the DCC 112. For example, a conference bridge may be established for a pre-configured length of time, at the conclusion of which the DCC 112 terminates the conference. Similarly, for example, the DCC 112 may detect that each of the UDs 122 has dropped from the conference. If the conference is terminated, method 300 proceeds to step 334, at which point method 300 ends. If the conference is not terminated, method 300 proceeds to step 324.

At step 324, a determination is made as to whether there is a UD change. For example, an existing UD participating in the conference may drop from the conference. Similarly for example, a new UD may join an existing conference. If there is not a UD change, method 300 returns to step 320, and the UDs continue to communicate using the configuration of SBs. If there is a UD change, method 300 proceeds to step 326. At step 326, a determination is made as to whether a UD is added to or dropped from the conference. If a UD is dropped from the conference, method 300 proceeds to step 328. If a UD is added to the conference, method 300 proceeds to step 332.

At step 328, a determination is made as to whether communication between the UDs is disrupted. For example, dropping of a non-combining UD such as UD $122_{A2}$ does not result in a disruption of communications between the remaining UDs. On the other hand, dropping of a combining UD such as UD $122_{A3}$ does result in a disruption of communications between UDs since UD $122_{A3}$ is responsible for facilitating communications between UDs $122_{A4}$ and $122_{A5}$ and the remaining of the UDs participating in the conference. If communication is not disrupted, method 300 returns to step 320, and the remaining UDs continue to communicate using the configuration of SBs. If communication is disrupted, method 300 proceeds to step 330.

At step 330, the configuration of sub-bridges is modified. In one embodiment, modification of the configuration is performed in a manner substantially similar to the functions described herein with respect to steps 308-318. In one further embodiment, modification of the configuration is determined using previously determined weighting factors. In continuation of the above example, in which UD $122_{A3}$ drops from the conference, the configuration is modified due to the break in communications capabilities between UDs $122_{A4}$ and $122_{A5}$ and the remaining UDs participating in the conference.

In this example, using the previously determined weighting factors, the DCC 112 may determine that modification of the configuration requires establishment of a SB between UDs $122_{A4}$ and $122_{A2}$, and establishment of a SB between UDs $122_{A5}$ and $122_{A4}$. As such, in this example, UD $122_{A4}$ becomes a combining UD and UD $122_{A5}$ remains a non-combining UD. The method 300 then returns to step 320, and the remaining UDs continue to communicate using the configuration of SBs.

At step 332, the configuration of sub-bridges is extended to support at least one additional UD. In one embodiment, extension of the configuration to support at least one additional UD is performed in a manner substantially similar to the functions described herein with respect to steps 306-318. For example, assume additional UD 212 located in SN $120_A$ attempts to join the existing conference. In this example, using the methodology described herein, the configuration is extended to support UD 212. As such, using the methodologies of the present invention, a determination is made as to whether additional UD 212 establishes a SB with UD $122_{A1}$, UD $122_{A2}$, UD $122_{A3}$, UD $122_{A4}$, or UD $122_{A5}$.

As depicted in FIG. 2, a determination is made that an additional SB (illustratively, $SB\ 210_9$) is established between UD $122_{A2}$ and additional UD 212. The UD $122_{A2}$ is thereby converted from a non-combining UD to a combining UD operable for combining audio and video content obtained from additional UD 212 and audio and video content obtained locally (i.e., via at least one user interface associated with UD $122_{A2}$) for transmission towards UD $122_{A1}$, and, ultimately, distribution to each of the other UDs 122. The method 300 then returns to step 320 (i.e., the UDs continue to communicate using the configuration of SBs).

It is contemplated that at least a portion of the described functions may be combined into fewer functional elements. Similarly, it is contemplated that various functions may be performed by other functional elements, or that the various functions may be distributed across the various functional elements in a different manner. For example, at least a portion of the functions of DCC 112 may be distributed across at least a portion of the UDs 122. Similarly, for example, at least a portion of the functions of DCC 112 may be distributed across various other network components located within CN 110 and the associated SNs 120. Furthermore, although primarily described herein with respect to an IP network, those skilled in the art will appreciate that the methodologies of FIG. 3 may be used for establishing a conference bridge between user devices associated with various other networks.

Figure 4:
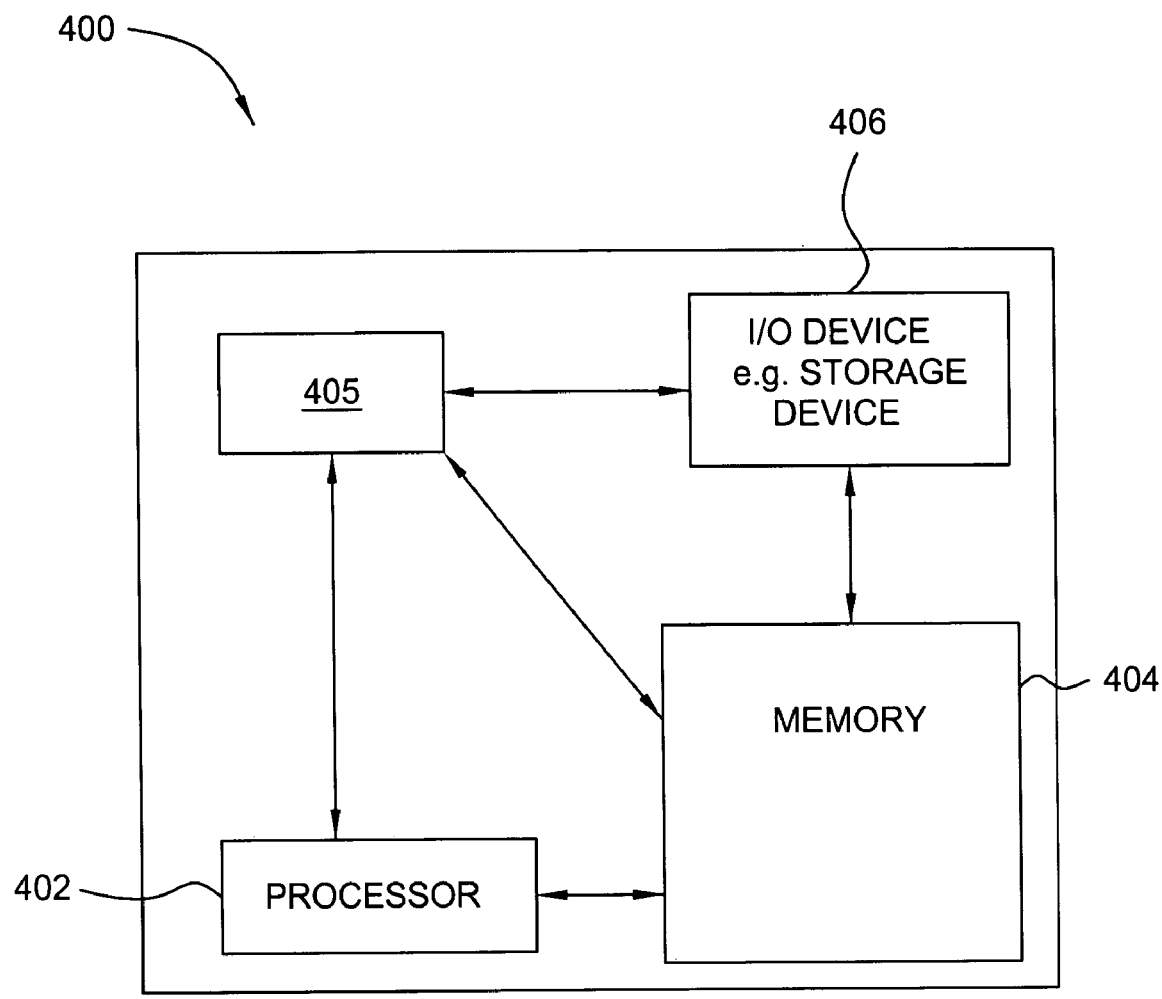
FIG. 4 depicts a high-level block diagram of a general purpose computer suitable for use in performing the functions described herein.

FIG. 4 depicts a high level block diagram of a general purpose computer suitable for use in performing the functions described herein. As depicted in FIG. 4, system 400 comprises a processor element 402 (e.g., a CPU), a memory 404, e.g., random access memory (RAM) and/or read only memory (ROM), a distributed conference control module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present distributed conference control module or process 405 can be loaded into memory 404 and executed by processor 402 to implement the functions as discussed above. As such, the distributed conference control process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for establishing a distributed conference bridge for communications between a plurality of user devices, comprising:
    using a processor for:
        determining, for each of a plurality of pairs of said user devices, a weighting factor associated with a communication path between said user devices of said pair of user devices;
        determining a configuration for said distributed conference bridge using said weighting factors, wherein said configuration comprises a plurality of communication paths between a respective plurality of pairs of said user devices, wherein at least one of said communication paths of said configuration comprises a communication path between a first combining user device and one of a second combining user device and a non-combining user device; and
        initiating establishment of said distributed conference bridge according to said configuration, comprising:
            for each combining user device: generating a sub-bridge establishment message for configuring the combining user device according to said configuration, and transmitting said sub-bridge establishment message toward said combining user device.

2. The method of claim 1, wherein each of said weighting factors is computed using at least one of a distance between said user devices of said pair of user devices, a path delay associated with said communication path between said user devices of said pair of user devices, respective locations of said user devices of said pair of user devices, and respective device characteristics of said user devices of said pair of user devices.

3. The method of claim 1, wherein, for each combining user device, said sub-bridge establishment message is for configuring said combining user device to perform at least one of audio switching, audio mixing, video switching, and video mixing.

4. The method of claim 1, wherein said initiating establishment further comprises:
    for each non-combining user device, generating a sub-bridge establishment message for configuring the non-combining user device according to said configuration, and transmitting said sub-bridge establishment messages toward said non-combining user device.

5. A non-transitory computer readable storage medium storing a software program, that, when executed by a computer, causes the computer to perform a method for establishing a distributed conference bridge for communications between a plurality of user devices, the method comprising:
    determining, for each of a plurality of pairs of said user devices, a weighting factor associated with a communication path between said user devices of said pair of user devices;
    determining a configuration for said distributed conference bridge using said weighting factors, wherein said configuration comprises a plurality of communication paths between a respective plurality of pairs of said user devices, wherein at least one of said communication paths of said configuration comprises a communication path between a first combining user device and one of a second combining user device and a non-combining user device; and initiating establishment of said distributed conference bridge according to said configuration, comprising:
for each combining user device: generating a sub-bridge establishment message for configuring the combining user device according to said configuration, and transmitting said sub-bridge establishment message toward said combining user device.

6. The non-transitory computer readable storage medium of claim 5, wherein each of said weighting factors is computed using at least one of a distance between said user devices of said pair of user devices, a path delay associated with said communication path between said user devices of said pair of user devices, respective locations of said user devices of said pair of user devices, and respective device characteristics of said user devices of said pair of user devices.

7. The non-transitory computer readable storage medium of claim 5, wherein, for each combining user device, said sub-bridge establishment message is for configuring said combining user device to perform at least one of audio switching, audio mixing, video switching, and video mixing.

8. The non-transitory computer readable storage medium of claim 5, wherein said initiating establishment further comprises:
for each non-combining user device, generating a sub-bridge establishment message for configuring the user device according to said configuration, and transmitting said sub-bridge establishment messages toward said non-combining user device.

9. An apparatus for establishing a distributed conference bridge for communications between a plurality of user devices, comprising:
means for determining, for each of a plurality of pairs of said user devices, a weighting factor associated with a communication path between said user devices of said pair of user devices;
means for determining a configuration for said distributed conference bridge using said weighting factors, wherein said configuration comprises a plurality of communication paths between a respective plurality of pairs of said user devices, wherein at least one of said communication paths of said configuration comprises a communication path between a first combining user device and one of a second combining user device and a non-combining user device; and
means for initiating establishment of said distributed conference bridge according to said configuration, wherein initiating establishment of said distributed conference bridge comprises:
for each combining user device: generating a sub-bridge establishment message for configuring the combining user device according to said configuration, and transmitting said sub-bridge establishment message toward said combining user device.

10. The apparatus of claim 9, wherein each of said weighting factors is computed using at least one of a distance between said user devices of said pair of user devices, a path delay associated with said communication path between said user devices of said pair of user devices, respective locations of said user devices of said pair of user devices, and respective device characteristics of said user devices of said pair of user devices.

11. The apparatus of claim 9, wherein said initiating establishment further comprises:
for each non-combining user device: generating, a sub-bridge establishment message for configuring the non-combining user device according to said configuration, and transmitting said sub-bridge establishment message toward said non-combining user device.

12. The apparatus of claim 9, wherein, for each combining user device, said sub-bridge establishment message is for configuring said combining user device to perform at least one of audio switching, audio mixing, video switching, and video mixing.

13. A method for determining a distributed configuration for a conference bridge for supporting communications between a plurality of user devices, comprising:
using a processor for:
determining, for each of a plurality of pairs of said user devices, a distance between user devices of the pair of user devices;
determining a configuration for the distributed conference bridge using the determined distances, wherein the configuration comprises a plurality of communication paths between a respective plurality of pairs of said user devices, wherein at least one of said communication paths of said configuration comprises a communication path between a first combining user device and one of a second combining user device and a non-combining user device; and
initiating establishment of said distributed conference bridge according to said configuration, comprising:
for each combining user device: generating a sub-bridge establishment message for configuring the combining user device according to said configuration, and transmitting said sub-bridge establishment message toward said combining user device.

14. An apparatus for determining a distributed configuration for a conference bridge for supporting communications between a plurality of user devices, comprising:
means for determining, for each of a plurality of pairs of said user devices, a distance between user devices of the pair of user devices;
means for determining a configuration for the distributed conference bridge using the determined distances, wherein the configuration comprises a plurality of communication paths between a respective plurality of pairs of said user devices, wherein at least one of said communication paths of said configuration comprises a communication path between a first combining user device and one of a second combining user device and a non-combining user device; and
means for initiating establishment of said distributed conference bridge according to said configuration, comprising:
for each combining user device: generating a sub-bridge establishment message for configuring the combining user device according to said configuration, and transmitting said sub-bridge establishment message toward said combining user device.

* * * * *